United States Patent [19]

Griffiths et al.

[11] Patent Number: 4,773,711
[45] Date of Patent: Sep. 27, 1988

[54] VEHICLE WHEELS

[75] Inventors: Phillip N. Griffiths, Sutton Coldfield; Mathew Simpson, Erdington, both of England

[73] Assignee: SP Tyres UK Ltd, Birmingham, England

[21] Appl. No.: 74,058

[22] Filed: Jul. 16, 1987

[30] Foreign Application Priority Data

Jul. 16, 1986 [GB] United Kingdom ............... 8617410

[51] Int. Cl.⁴ .................... B60B 21/10; B60B 21/00
[52] U.S. Cl. ................................. 301/96; 152/379.3; 152/381.4
[58] Field of Search ............ 301/96, 97, 95, 98; 152/379.3, 379.4, 379.5, 381.3, 381.4, 375, 381.5, 381.6

[56] References Cited

U.S. PATENT DOCUMENTS 3,664,405  5/1972  Poyner ........................ 152/379.3
4,241,776 12/1980  Stewart ........................... 301/97

FOREIGN PATENT DOCUMENTS 2902063  7/1979  Fed. Rep. of Germany ... 152/381.4

Primary Examiner—James B. Marbert
Attorney, Agent, or Firm—Birch, Stewart, Kolasch & Birch

[57] ABSTRACT

A vehicle wheel rim includes a pair of spaced-apart tire bead seats, axially outwards of each bead seat a tire retaining flange, and axially inwards but immediately adjacent thereto a circumferentially extending tire toe engaging groove. The groove is subdivided in the circumferential direction by at least three bridge members each of which is short in the circumferential direction and traverses the groove to provide a bridge surface substantially at the top of the groove such that the bridge surface may support a normal tire bead when used on the wheel or alternatively a tire with a bead retention toe may engage the toe in the groove to provide bead retention in use.

Preferably four to eight bridge members are provided.

The resultant wheel safely carries a normal tire or a TD type of tire with a projecting, bead retaining toe.

11 Claims, 1 Drawing Sheet

VEHICLE WHEELS

The present invention relates to vehicle wheels and in particular to wheel rims of the type disclosed in UK Patent Specification No. 1584554, which provides a wheel rim having adjacent to and axially inwards of each bead seat a circumferentially-extending, continuous groove. The groove is designed to accommodate a special toe on the tire for which the wheel rim is designed and together they provide an assembly with a very high degree of bead retention and resultant vehicle safety even in the event of a tire deflation. Such tires and wheel rims are available in some countries with the designation "TD" on the wheel rim and tire.

A problem with this type of wheel is that if a normal tire without the "TD" toe but of the same nominal bead seating diameter is fitted to the wheel rim, while full inflation is readily achieved, improper air retention occurs in some service conditions. In particular, when cornering with the tire only slightly deflated the bead can rock on its seat into the groove and allow further air loss. This has resulted in tires and wheels of the "TD" type being limited to non-standard bead seat diameters to avoid dangerous mismatching.

The present situation overcomes the above problem with such wheels and provides a wheel rim suitable for use with a tire having a bead retaining toe as well as with normal tires.

According to one aspect of the present invention a wheel rim is provided comprising a pair of spaced-apart tire bead seats, axially outwards of each bead seat a tire bead retaining flange and axially-inwards but immediately adjacent thereto a circumferentially extending tire toe engaging groove characterised by the groove being subdivided in the circumferential direction by at least three bridge members each of which is short in the circumferential direction and transverses the groove to provide a bridge surface substantially at the top of the groove such that the bridge surfaces may support a normal tire bead when used on the wheel rim or alternatively a tire with a bead retention toe may engage the toe in the grove to provide bead retention in use.

Preferably there are between four and eight bridge members and these are in addition equally spaced around the groove. Each bridge member may have its bridge surface parallel to the axis of the wheel rim or at the same taper angle to the bead seat so that both are in the same straight line.

The bridge surface may additionally include a tire retaining hump which may be between 2 and 5 mm in height. This height may be higher than could be used on a full continuously extending circumferential hump for reasons to be explained.

The bridge members are preferably between 5 and 20 mm in length measured in the circumferential direction of the groove.

The bridge members may be formed integrally with the wheel rim for example by a one piece casting or may be formed separately and attached thereto subsequently. Suitable attachment means for conventional rolled steel rims include welding and spot welding. Alternatively it is feasible to provide bridge members linked by a harness of steel cord to allow temporary fitting to a wheel rim although permanent bridge members are preferred to ensure there is no tire assembly without bridge members in place in the groove.

Further aspects of the present invention will be apparent from the following description, by way of example only of some embodiments in conjunction with the attached diagramatic drawings in which.

Figure 1:
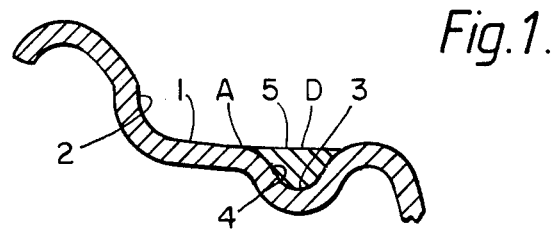
FIG. 1 is a scrap cross-section of one bead seat of a wheel rim sectioned through a groove bridge member.

The wheel rim showin in part in FIG. 1 is a 165×13" rim and comprises a 5° tapered tire bead seat 1 and at the axially outer edge of the bead seat a radially projecting tire retaining flange 2. Immediately adjacent to the tapered seat there is a groove 3. The groove 3 is the standard circumferentially extending groove shown in UK Patent Specification No. 1584554 and is shaped so as to accept a tire toe of the "TD" type.

Figure 2:
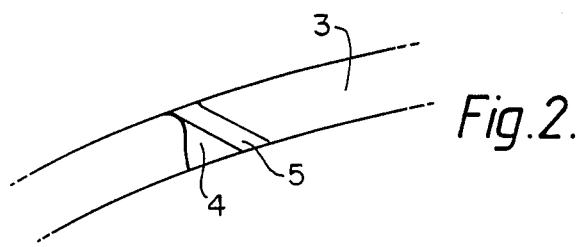
FIG. 2 is a perspective view of part of a groove.

As shown in FIG. 2 a bridge member 4 is positioned in the groove. The bridge member is 3 mm long measured in the direction of the groove and has a smooth top surface 5 which is tapered at 5°. The top surface 5 is also positioned so that it forms a straight continuation of the bead seat 1 and thus at the points on the wheel rim where there are bridge members 4 the wheel rim is effectively a conventional one.

The wheel rim has four steel bridge members 4 equally spaced apart around the groove 3 and thus at four points the bead seating region is of a conventional tapered form. The remainder of the circumference of the wheel rim, however, is of the 'TD' type although in this case the wheel rim is a conventional 13" diameter wheel rim. When a "TD" type of tire is fitted to the wheel rim the tire toe enters the groove 3 everywhere around the rim except for the immediate vicinity of the four bridge members. This has been shown to be adequate for good bead retention comparable to the same "TD" type tire on a normal "TD" type rim.

When a conventional tire is fitted, which is not specifically designed for the "TD" rim its bead may be of various widths depending on the tyre detail design which varies from one manufacturer to another. Thus for example when normally fitted the tire toe may be at the position marked A. When under a severe cornering test the toe may move to point D but this has been shown in tests to be a safe position without resultant air loss. This is believed to be a result of the bridge members' preventing the tire bead from rocking and thus lifting its heel from the seat as its small conventional toe enters the groove.

Figure 3:
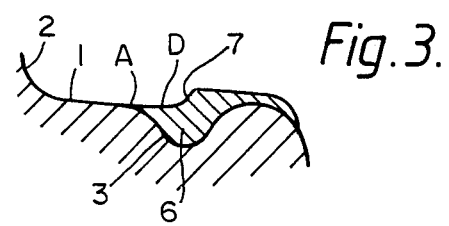
FIG. 3 is a scrap cross-section similar to FIG. 1 and and alternative groove bridge member.

The alternative bridge member 6 shown in FIG. 3 includes a high bead retaining hump 7. This may be of a much greater height than if it were a conventional circumferentially continuous hump because four very short spaced apart humps result. Thus on fitting the tire the bead ring is able to deform to fit over the humps without the ring being excessively tensioned. The resultant construction provides still greater bead retention for a standard tire on a "TD" type rim.

The number of bridge members may be other than four but it is important to ensure that sufficient groove length is left for a "TD" type of tire to work to its full safety potential.

The bridge members may be welded in place, for example by spot welding, or may be cast integrally with an alloy wheel. This may, of course, be at the original wheel manufacturing stage or groove members may be fitted as an in-service modification. The great advantage of such permanently fitted bridge members is that there is no chance of misassembly by, for example, omitting to fit them.

Having now described my invention what we claim is:

1. A vehicle wheel rim comprising a pair of spaced-apart tire bead seats, axially outwards of each bead seat a tire bead retaining flange, and axially inwards but immediately adjacent thereto a circumferentially extending tire toe engaging groove wherein said groove is subdivided in the circumferential direction by at least three bridge members each of which is short in the circumferential direction and traverses the groove to provide a bridge surface substantially at the top of the groove such that the bridge surface may support a normal tire bead when used on the wheel rim or alternatively a tire with a bead retention toe may engage said toe in the groove to provide retention in use.

2. A wheel rim according to claim 1 wherein between four and eight bridge members are provided in each bead tow engaging groove.

3. A wheel rim according to claim 1 wherein the bridge members are equally spaced around the circumferential direction of the wheel rim.

4. A wheel rim according to claim 1 wherein the bridge members have a bridge surface extending across the groove parallel to the axis of the wheel rim.

5. A wheel rim according to claim 1 wherein the bridge members have a bridge surface which is tapered at the same angle as the bead seat so that said bridge surface is in the same straight line as the bead seat.

6. A wheel rim according to claim 1 wherein the bridge surface includes a tyre toe engaging hump formed thereon.

7. A wheel rim according to claim 6 wherein the hump has a height in the range of 2 to 5 mm.

8. A wheel rim according to claim 1 wherein the bridge members are between 2 and 20 mm in length measured circumferentially of the wheel rim.

9. A wheel rim according to claim 1 wherein the bridge members are formed integrally with the wheel rim.

10. A wheel rim according to claim 1 wherein the bridge members are formed separately to the wheel rim and are subsequently attached thereto.

11. A wheel rim according to claim 10 wherein the bridge members are welded to the wheel rim.

* * * * *